No. 694,071. Patented Feb. 25, 1902.
I. E. PALMER.
HAMMOCK SPREADER.
(Application filed Jan. 24, 1901.)
(No Model.)
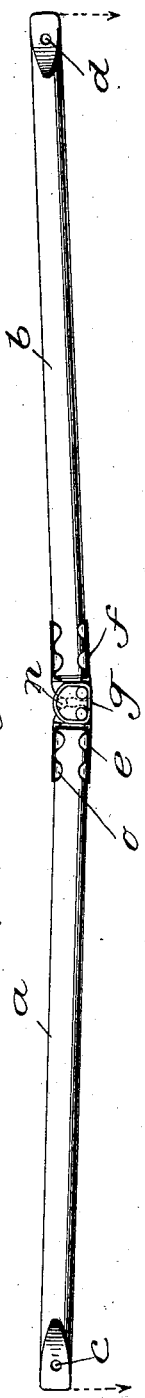
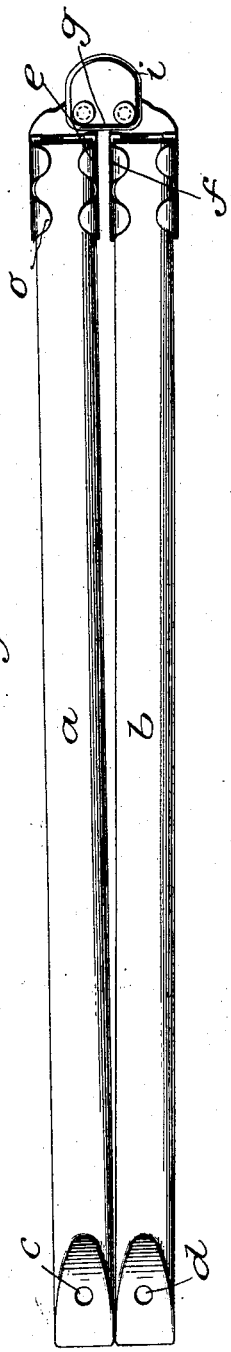
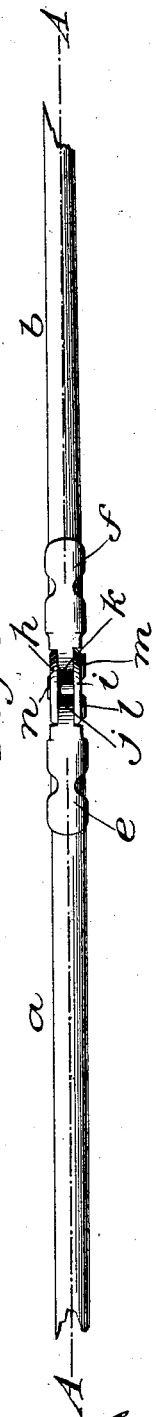

UNITED STATES PATENT OFFICE.

ISAAC E. PALMER, OF MIDDLETOWN, CONNECTICUT.

HAMMOCK-SPREADER.

SPECIFICATION forming part of Letters Patent No. 694,071, dated February 25, 1902.

Application filed January 24, 1901. Serial No. 44,502. (No model.)

*To all whom it may concern:*

Be it known that I, ISAAC E. PALMER, a citizen of the United States, and a resident of Middletown, in the county of Middlesex and State of Connecticut, have invented a new and useful Hammock-Spreader, of which the following is a specification.

My invention relates to a hammock-spreader, with the object in view of providing a folding spreader which shall be simple in construction, light, and strong.

A practical embodiment of my invention is represented in the accompanying drawings, in which—

Figure 1 is a view of the spreader in face or front elevation as it appears when extended for use. Fig. 2 is an enlarged face view showing the spreader in its folded adjustment. Fig. 3 is a partial edge view of the same in proximity to the hinge, showing the parts in their extended position; and Fig. 4 is a longitudinal section taken in the plane of the line A A of Fig. 3.

In speaking of the face view it is to be understood that the face of the spreader is that side which lies uppermost when the hammock is strung for use, and the position shown in Fig. 1 is that which the spreader assumes when extended transversely across the head of the hammock, the hinge-pintles of the two arms being on the side or edge of the spreader toward the foot of the hammock.

The arms of the folding spreader are denoted by $a$ $b$. They are preferably formed of some strong wood—such, for example, as ash—and are made a flattened oval in cross-section, as would be evident from an examination of Figs. 2 and 3, which show, respectively, the face and edge views. At their extreme ends they are conveniently provided with perforations $c$ $d$ for convenience in attaching the ends of the spreader to the opposite edges of the hammock-body, and at their opposite ends they are provided with hinge-pieces, the hinge-piece on the arm $a$ being denoted by $e$ and the corresponding hinge-piece on the arm $b$ being denoted by $f$. The hinge-piece common to the two pieces $e$ and $f$ is denoted as a whole by $g$ and is located intermediate of the adjacent ends of the arms $a$ $b$. The said common hinge-piece consists of a pair of plates $h$ and $i$, (see Fig. 3,) spaced apart to receive between them the perforated extensions $j$ $k$ on the hinge-pieces $e$ and $f$. Hinge-pintles, in the present instance in the form of rivets, (denoted by $l$ $m$,) extend transversely through the plates $h$ $i$ and through the perforated extensions $j$ $k$ to attach the arms $a$ $b$ in swinging adjustment to the common hinge-piece $g$, and a third rivet or pin $n$ extends transversely across the space between the plates $h$ $i$, above and in a plane between the pintles $l$ $m$, to form a stop for the arms $a$ $b$ to limit their swinging movement into their extended position. The stop-pin $n$ is so located with respect to the ends of the two arms $a$ $b$ that the two arms will be allowed to swing a little past a fully-extended position, as shown in Fig. 1, so that pressure on the opposite ends, as at $c$ $d$, toward the center will have a tendency to hold the arms firmly in their extended position without need of any additional lock.

When it is desired to fold the spreader, it may be folded together within the folding of the hammock by allowing the opposite ends of the arms $a$ $b$ to swing toward each other in the direction of the dotted lines, Fig. 1.

For the purpose of conveniently attaching the hinge-pieces $e$ and $f$ to their respective arms $a$ and $b$, I form the said hinge-pieces of malleable metal and provide the opposite edges of the walls which compose the half-sockets for the reception of the arms $a$ $b$ with the rounded teeth $o$, which may be compressed into the wood of the arm when the end of the latter has been placed between the walls of the half-sockets.

What I claim is—

1. A hammock-spreader comprising a pair of arms, the members of the pair of arms being provided on their adjacent ends with hinge-pieces, a hinge-piece common to the two arms and consisting of plates spaced apart, a stop-pin and hinge-pintles, connecting the said plates, the stop-pin being so located with relation to the hinge-pintles that the arms will engage it only when swung past a fully-extended position, substantially as set forth.

2. A hammock-spreader comprising a pair of wooden arms, hinge-pieces at the adjacent ends of the arms, the said hinge-pieces at the adjacent ends of the arms being provided with skeleton sockets terminating at their edges with malleable-metal teeth for gripping the arms and a hinge-piece common to the two arms and provided with pintles and a stop, the said stop and hinge-pintles being so located with relation to the arms that the latter will be arrested by the stop only when swung past their fully-extended position, substantially as set forth.

In testimony that I claim the foregoing as my invention I have signed my name, in presence of two witnesses, this 12th day of January, 1901.

ISAAC E. PALMER.

Witnesses:
CHAS. M. SAUER,
PAUL S. CARRIER.